(12) United States Patent
Kim et al.

(10) Patent No.: US 11,650,541 B2
(45) Date of Patent: May 16, 2023

(54) METHOD FOR OBTAINING FULL-COLOR HOLOGRAM OPTICAL ELEMENT USING PHOTOPOLYMER, AND HEAD-UP DISPLAY APPARATUS WITH THE SAME

(71) Applicant: CHUNGBUK NATIONAL UNIVERSITY INDUSTRY-ACADEMIC COOPERATION FOUNDATION, Cheongju-si (KR)

(72) Inventors: Nam Kim, Seoul (KR); Young Tae Lim, Cheongju-si (KR); Chang Won Shin, Hwaseong-si (KR); Ki Chul Kwon, Cheongju-si (KR)

(73) Assignee: CHUNGBUK NATIONAL UNIVERSITY INDUSTRY-ACADEMIC COOPERATION FOUNDATION, Cheongju-si (KR)

( * ) Notice: Subject to any disclaimer, the term of this patent is extended or adjusted under 35 U.S.C. 154(b) by 694 days.

(21) Appl. No.: 16/227,772

(22) Filed: Dec. 20, 2018

(65) Prior Publication Data
US 2020/0192282 A1  Jun. 18, 2020

(30) Foreign Application Priority Data

Dec. 18, 2018 (KR) ........................ 10-2018-0164230

(51) Int. Cl.
*G03H 1/04* (2006.01)
*G02B 27/01* (2006.01)
(52) U.S. Cl.
CPC ....... *G03H 1/0402* (2013.01); *G02B 27/0103* (2013.01); *G03H 1/0465* (2013.01);
(Continued)

(58) Field of Classification Search
CPC ...... G03H 1/0402; G03H 1/0465; G03H 1/02; G03H 1/04; G03H 1/28; G03H 1/22;
(Continued)

(56) References Cited

U.S. PATENT DOCUMENTS

| | | | |
|---|---|---|---|
| 6,292,279 B1 * | 9/2001 | Matsuyama | G03H 1/0486 250/201.1 |
| 2008/0138717 A1 | 6/2008 | Bjelkhagen et al. | |
| 2012/0250306 A1 * | 10/2012 | Sugiyama | H04N 9/3129 362/231 |

OTHER PUBLICATIONS

Vásquez-Martín et al (True colour Denisyuk-type hologram recording in Bayfol HX self-developing photopolymer, Proc. of SPIE, vol. 10233, pp. 1-8, Date:May 15, 2017) (Year: 2017).*

(Continued)

*Primary Examiner* — Stephone B Allen
*Assistant Examiner* — Jyotsna V Dabbi
(74) *Attorney, Agent, or Firm* — Sughrue Mion, PLLC

(57) ABSTRACT

A method of manufacturing a full-color holographic optical element in a full-color holographic optical element manufacturing apparatus including a lens and a holographic recording medium located farther away than a focal length of the lens, the method including: allowing a signal beam including a mixture of laser beams having wavelengths of R (Red), G (Green), and B (Blue) to be incident on the lens; and recording a hologram in such a manner that a reference beam including a mixture of laser beams having wavelengths of R, G, and B is allowed to be incident on the holographic recording medium, wherein the holographic recording medium is configured with a single medium.

4 Claims, 14 Drawing Sheets

(52) U.S. Cl.
CPC ............ *G02B 2027/0109* (2013.01); *G03H 2001/0439* (2013.01); *G03H 2222/13* (2013.01); *G03H 2260/12* (2013.01)

(58) Field of Classification Search
CPC ...... G03H 1/26; G03H 1/2645; G03H 1/0486; G03H 1/0005; G03H 2001/0439; G03H 2001/266; G03H 2001/2223; G03H 2001/2271; G03H 2001/2284; G03H 2001/2231; G03H 2001/2236; G03H 2001/0216; G03H 2001/0473; G03H 2001/0415; G03H 2001/026; G03H 2222/13; G03H 2222/18; G03H 2222/34; G03H 2222/52; G03H 2240/56; G03H 2240/24; G03H 2240/40; G03H 2240/51; G03H 2240/52; G03H 2240/53; G03H 2223/17
USPC .................................................. 359/1, 3, 13
See application file for complete search history.

(56) References Cited

OTHER PUBLICATIONS

Vázquez-Martín et al., "True colour Denisyuk-type hologram recording in Bayfol HX self-developing photopolymer" SPIE Optics + Optoelectronics, 2017, Prague, Czech Republic, vol. 10233, (9 pages total).
Communication dated Jul. 29, 2020, issued by the Korean Patent Office in counterpart Korean application No. 10-2018-0164230.

* cited by examiner

FIG. 1
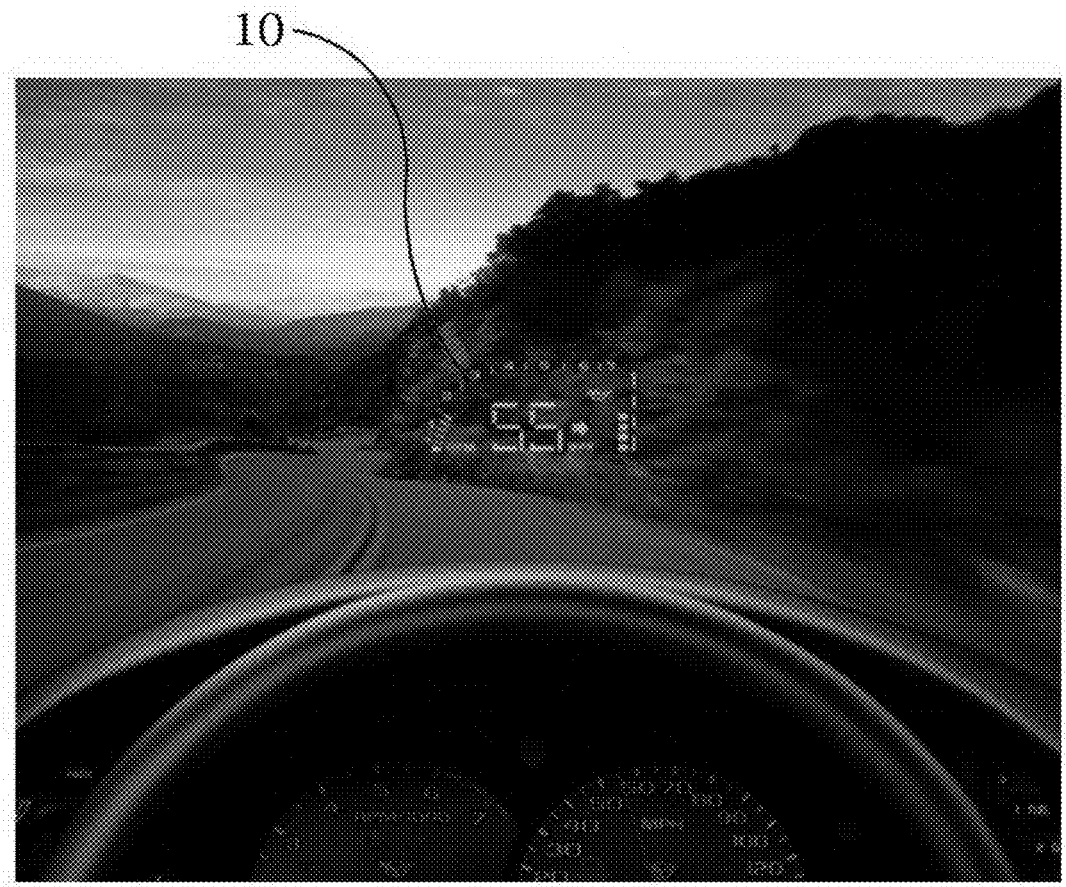
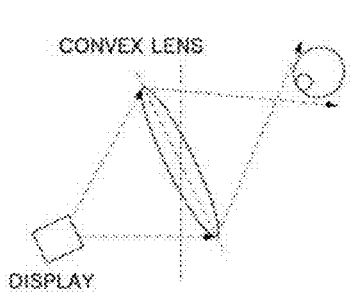
FIG. 2A
-- PRIOR ART--
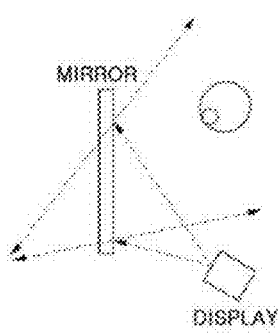
FIG. 2B
-- PRIOR ART--
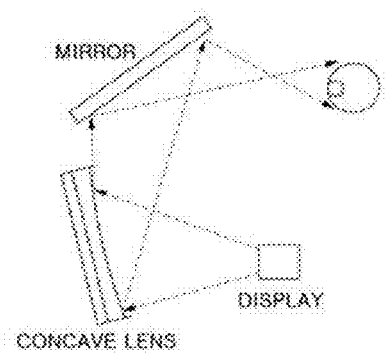
FIG. 2C
-- PRIOR ART--

<FIG. 4>
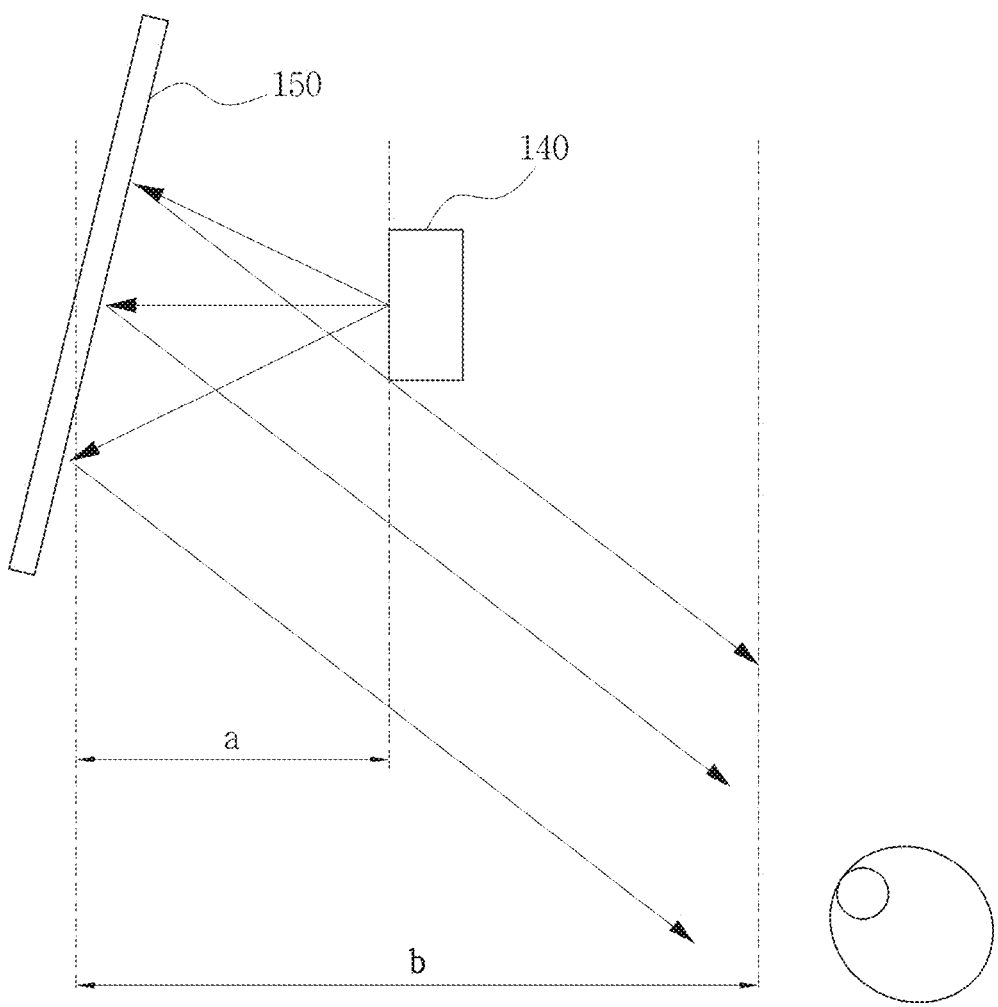

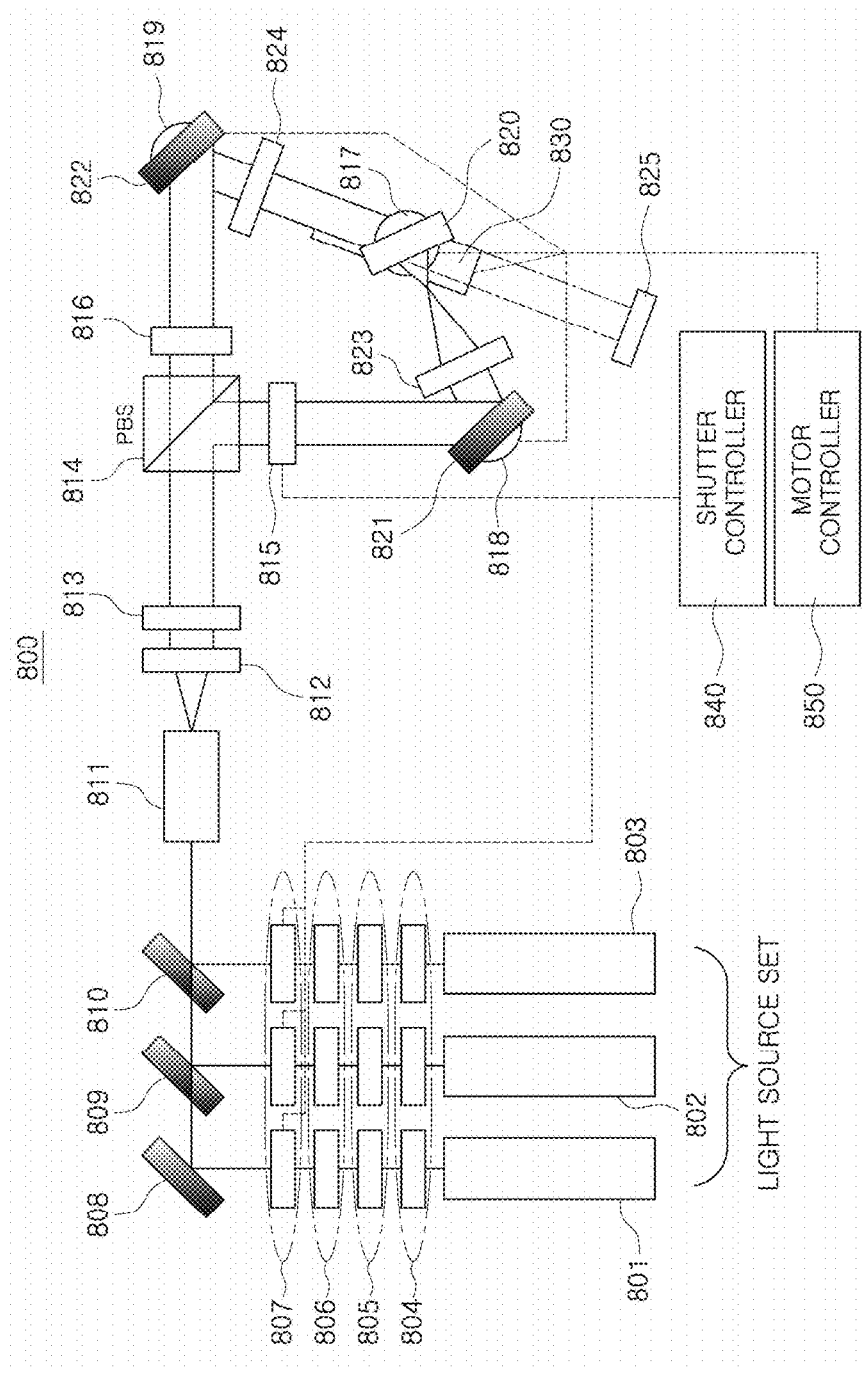
<FIG. 8>

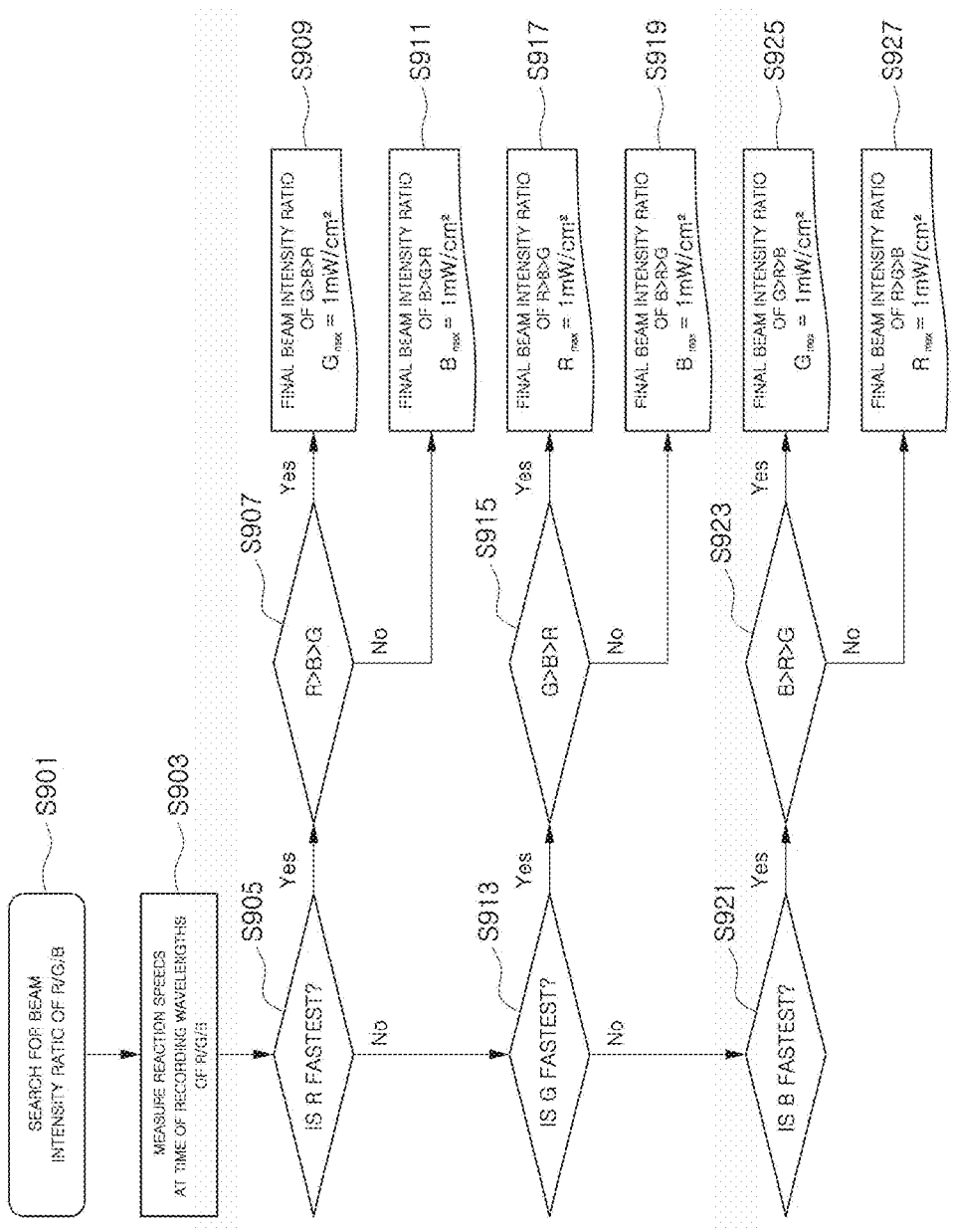

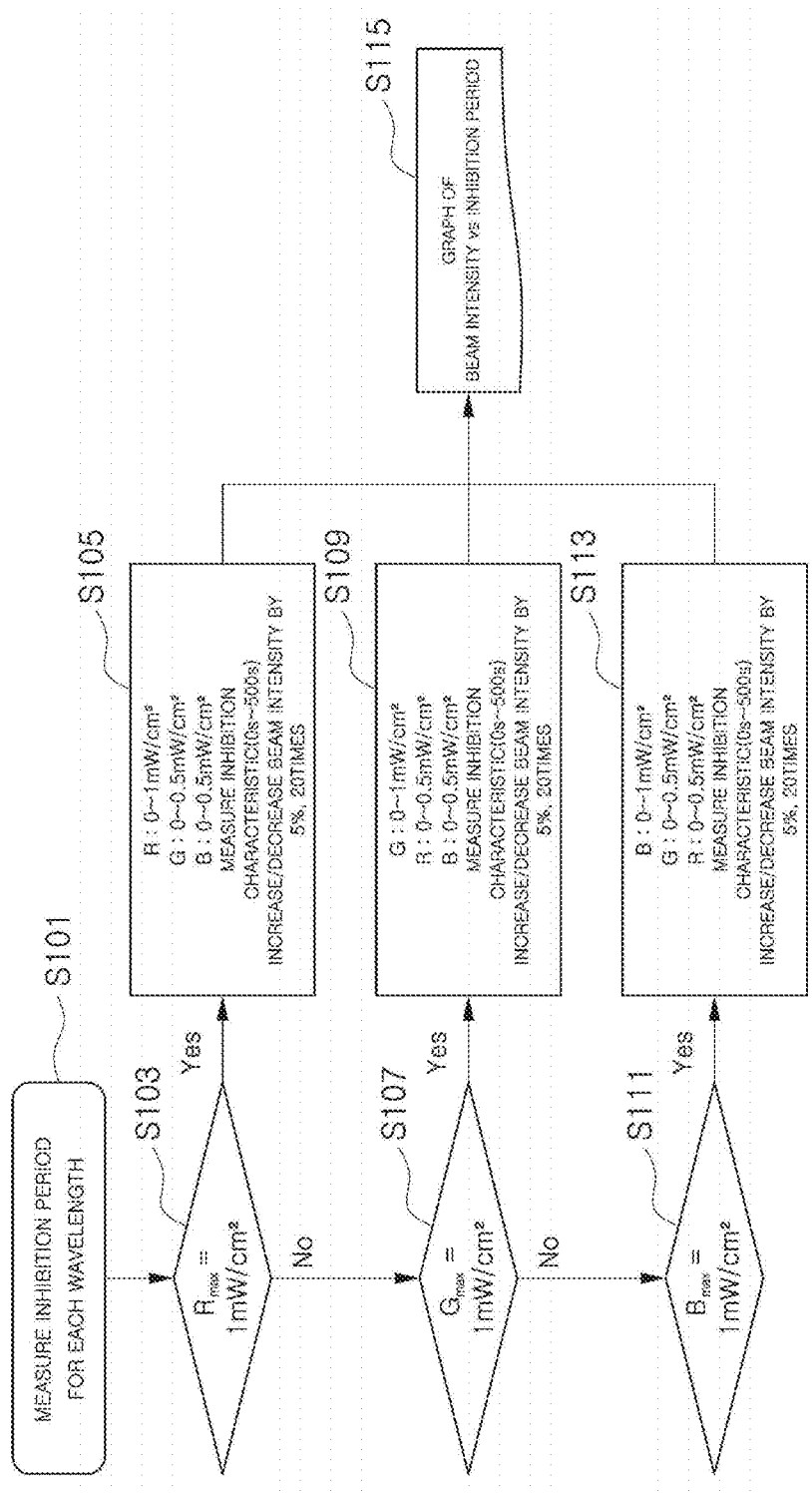

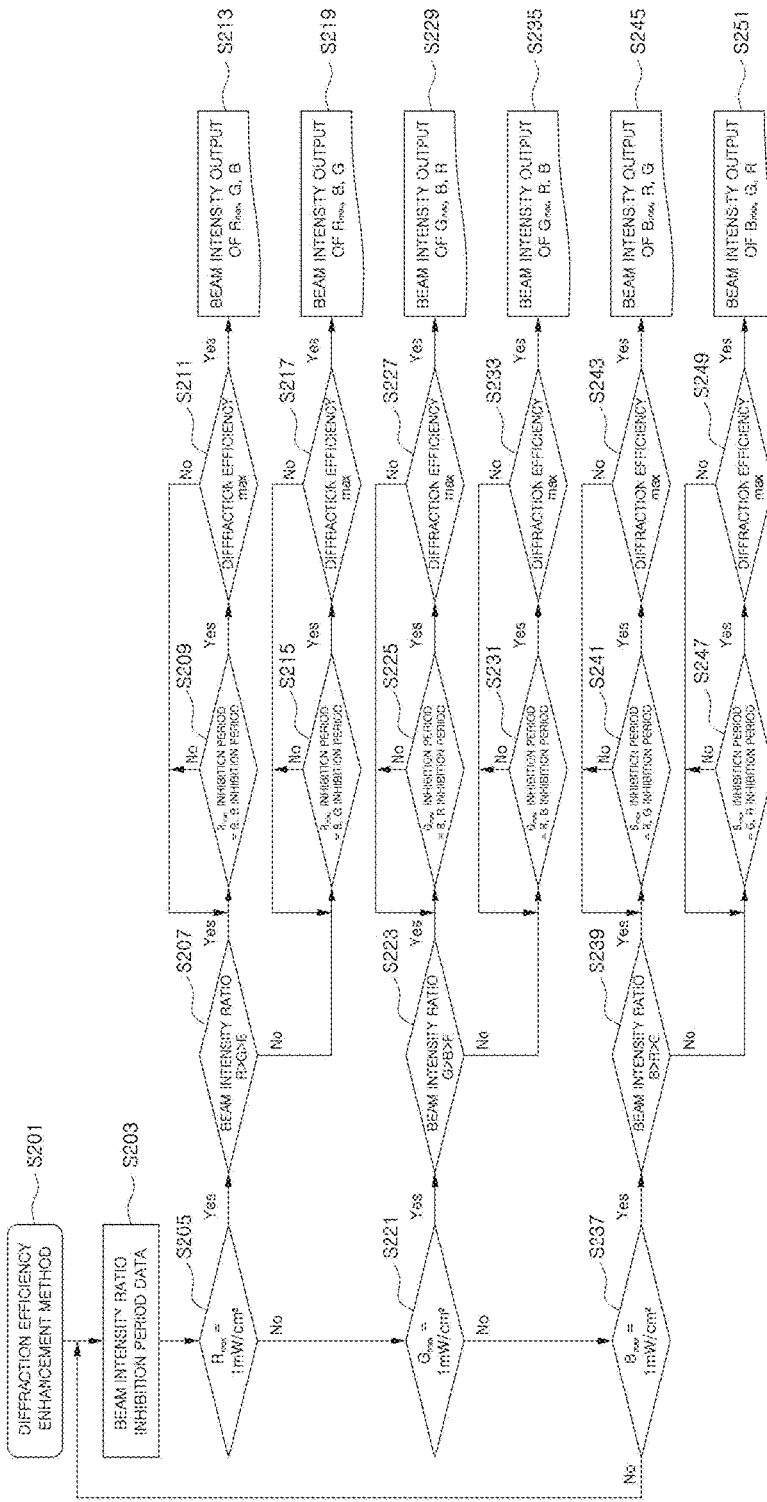

<FIG. 12>
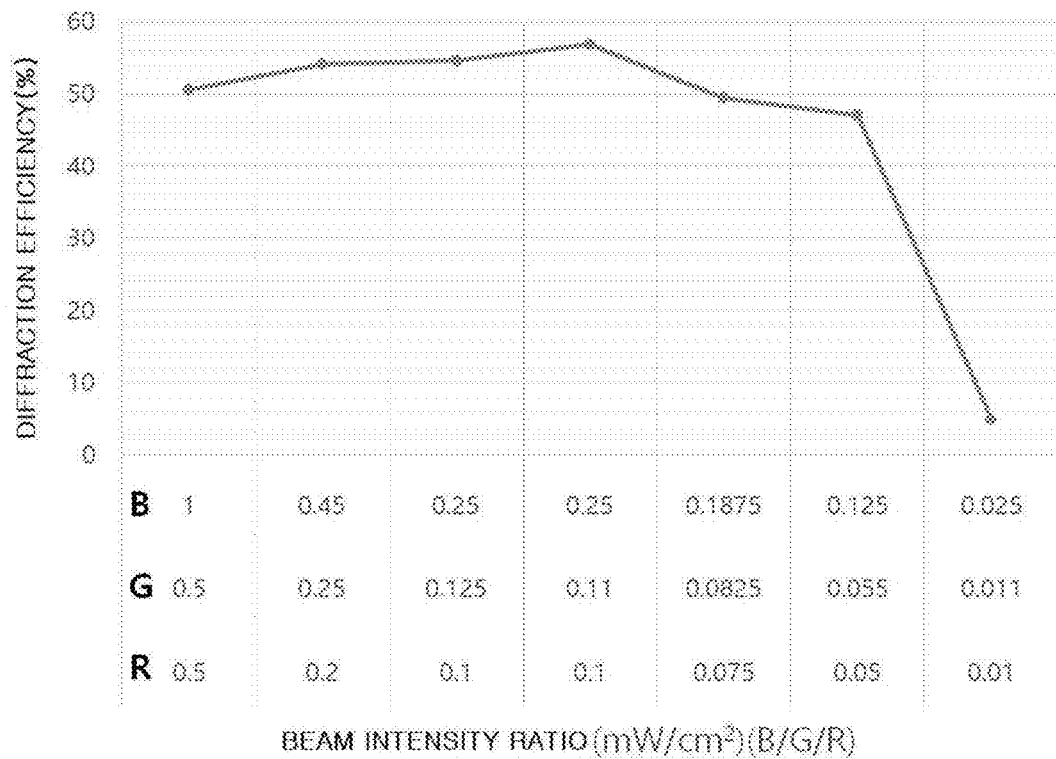
<FIG. 13>
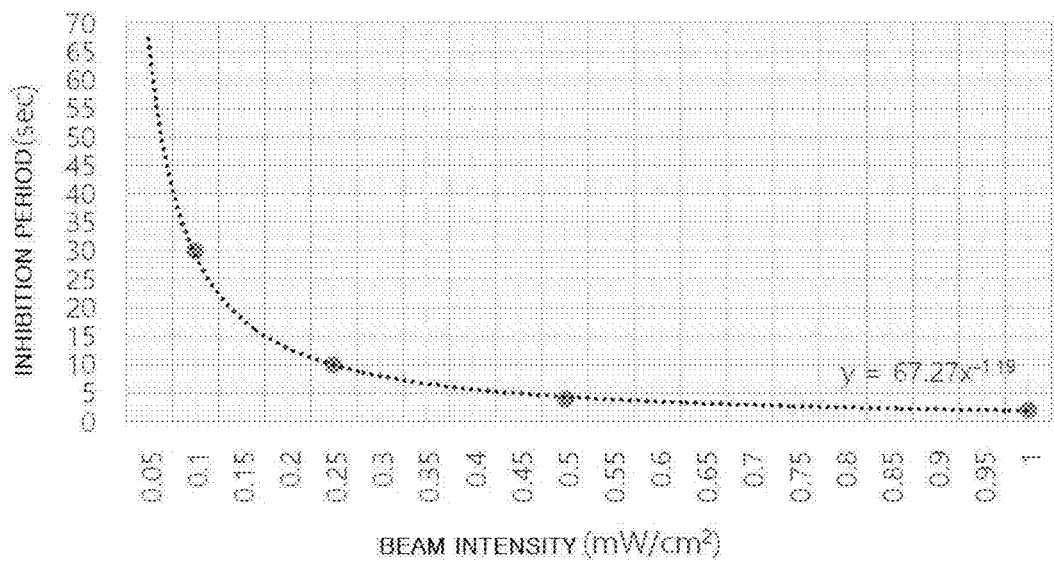

<FIG. 14>
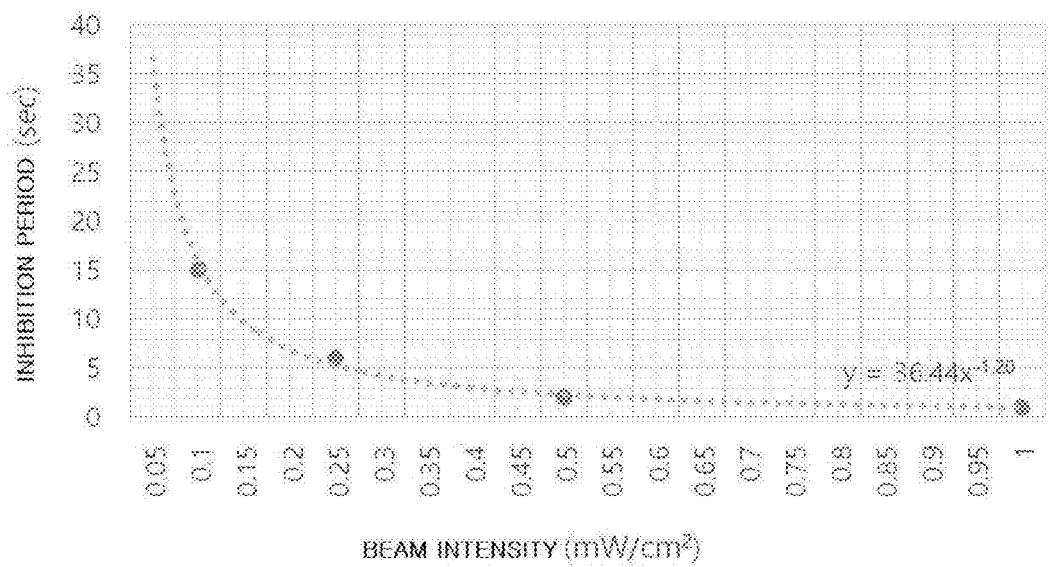
<FIG. 15>
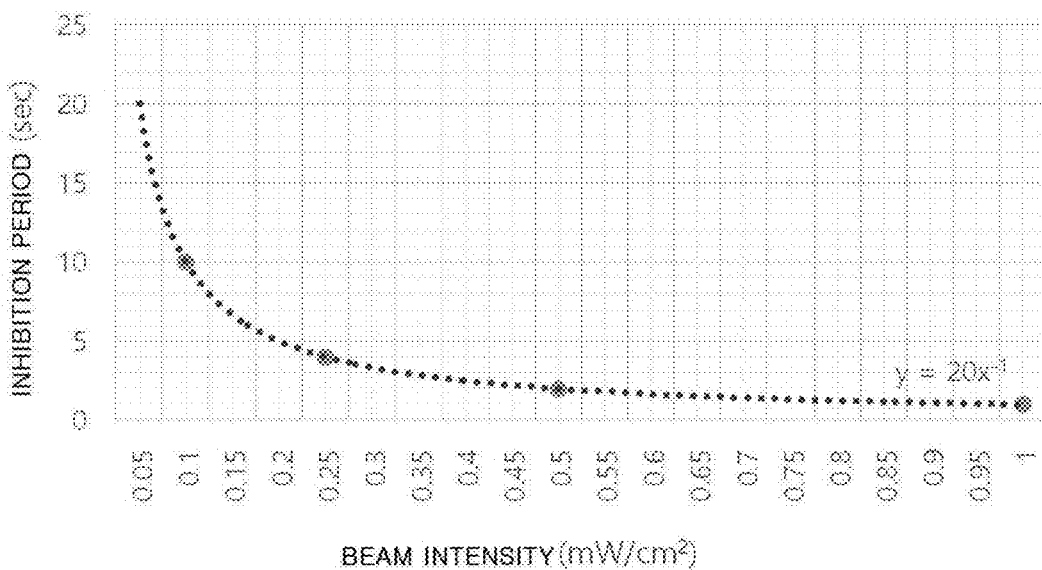

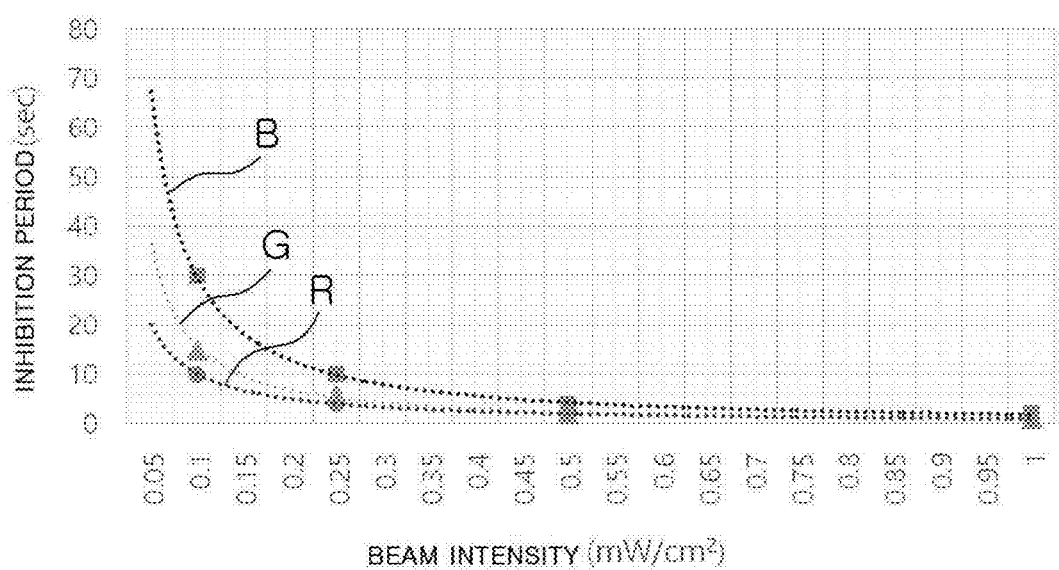
<FIG. 16>

METHOD FOR OBTAINING FULL-COLOR HOLOGRAM OPTICAL ELEMENT USING PHOTOPOLYMER, AND HEAD-UP DISPLAY APPARATUS WITH THE SAME

TECHNICAL FIELD

The present invention relates to a holographic optical element, and more particularly, to a method of manufacturing a full-color holographic optical element.

BACKGROUND

Holography is a technique for recording and reproducing not only amplitude information of light but also phase information on a recording medium by using diffraction and interference phenomena of light. Holographic display is an ultimate 3D technology that allows for more complete stereoscopic viewing. There are various types of hologram media that can record stereoscopic information of an image such as silver halide photographic plates, dichromate, gelatin, photochromic, photorefractive crystal, and photopolymer.

In recent years, a lot of research has been made on a holographic medium. Photopolymers are easy to use for hologram recording applications because of high sensitivity, simple real-time processing, high diffraction efficiency, high resolution, and low cost. In order to apply the photopolymer as a recording medium to holographic display technology, it is necessary to analyze the optical properties of the medium.

As hologram optical devices using the hologram media, there are mainly research products that can be diffracted for monochromatic wavelengths. Unlike analog image holograms, the hologram optical devices which are greatly affected by wavelength selectivity and angle selectivity have different characteristics at each wavelength.

Recently, the holographic optical element used for augmented reality adopts a method of manufacturing an optical element by laminating two or more layers instead of a single holographic medium. However, this structure has a disadvantage in that it has distortion information caused by reflected light due to a refractive index of the holographic medium deposited on each layer in the laminated structure and the yield is not constant.

On the other hand, in the 21st century, human living spaces can be classified into three types: house, workplace, and moving space. In particular, most of the moving space is occupied by vehicles. Therefore, as the time on the vehicle increases, electronic products that have been used in residential space are being developed for use in vehicles as well.

For example, an audio-video system, a simple refrigerator, and the like are installed in the vehicle. In addition, as electronic products are developed, the electronic products are also applied to fields that help driving. A representative example is car navigation. By the way, the driver needs to drive the vehicle while identifying objects in the field of view and checking the driving state. Among several systems under development that provide driver's safety during the driving and effectively provide driving information of the vehicle and surrounding state information to the driver, a head-up display (HUD) becomes a major concern.

As described above, at present, a head-up display (HUD) system for displaying various vehicle information as a virtual image on a windshield in front of the driver's seat so that the driver can check the vehicle information while keeping the eyes on the front side during the driving has been developed and installed in vehicles.

The head-up display is a system that provides driving information or other information of a vehicle in the front of the driver, that is, within the range of the driver's main line of gaze during the driving of the vehicle or aircraft.

Usually, since a vehicle moves about 55 m for the time (about 2 seconds) when the driver fixes the driver's eyes to the dashboard during the driving at about 100 m/h and, then, turns the driver's eyes to the road, there is a risk. One of the ways to reduce this risk is to develop and use an HUD for vehicle. The HUD for vehicle displays information (speed, mileage, RPM, and the like) of the dashboard on the driver's main line of gaze in the front windshield so that the driver can easily recognize driving information during the driving. Therefore, the driver can perform safe driving by recognizing important driving information without taking his or her eyes off the road.

In general, the head-up display system is configured with a display unit, an optical system, a holographic combiner, and the like and displays various information related to driving to the driver in front of the vehicle.

FIG. 1 illustrates a virtual image formed on a windshield of a vehicle provided with a head-up display.

In FIG. 1, it is checked that the virtual image 10 in which vehicle information is displayed on the windshield is displayed.

That is, the head-up display device generates a predetermined image on the basis of driving information such as a current speed and a position of the vehicle through a display unit, projects the image on a holographic combiner attached to a windshield on the front side of the vehicle by using an optical system to form a predetermined virtual image on an empty space in front of the vehicle, so that a driver can see the information related to the driving such as the current position and speed of the vehicle without turning the gaze and checking the dashboard.

Like this, the head-up display for the vehicle provides the driver with a variety of information including navigation. However, in the case of the head-up display in the related art, since the image information is reproduced mostly at a fixed position, the driver required to watch the front side may be confused in the gazing region of the field of view.

Therefore, the research has been focused on the head-up display for the vehicle capable of minimizing dispersion of the gaze and providing safe visual information.

As a cited literature, there is Korean Patent Application Publication No. 10-2018-0113403.

SUMMARY

The invention is to provide a method of manufacturing a full-color holographic optical element by using a photopolymer which is recorded in a single medium using a photopolymer, so that it is possible to prevent distortion caused by reflected light, to obtain a constant yield, and to improve diffraction efficiency.

The objects of the invention are not limited to the above-mentioned objects, and other objects not mentioned can be clearly understood by those skilled in the art from the following description.

According to an aspect of the invention, there is provided a method of manufacturing a full-color holographic optical element in a full-color holographic optical element manufacturing apparatus including a lens and a holographic recording medium located farther away than a focal length of the lens, the method including: allowing a signal beam including a mixture of laser beams having wavelengths of R (Red), G (Green), and B (Blue) to be incident on the lens;

and recording a hologram in such a manner that a reference beam including a mixture of laser beams having wavelengths of R, G, and B is allowed to be incident on the holographic recording medium, wherein the holographic recording medium is configured with a single medium.

In the aspect of the invention, the holographic recording medium may be embodied as a photopolymer.

In addition, in the aspect of the invention, the full-color holographic optical element manufacturing apparatus measures reaction speeds of the laser beams of R, G, and B when recording a holographic grating in the photopolymer and sets intensities of the laser beams in a reverse order of an order of the reaction speeds of the laser beams.

In addition, in the aspect of the invention, when a time period during which a reaction does not occur from a time when the photopolymer is irradiated with the laser beams and to a time when formation of the holographic grating is started is referred to as an inhibition period, the full-color holographic optical element manufacturing apparatus sets the intensities of the laser beams of R, G, and B so that the inhibition periods for the laser beams of R, G, and B are the same.

According to the invention, a hologram is recorded in a single medium using a photopolymer instead of a full-hologram holographic optical element in the related art, so that it is possible to prevent distortion caused by reflected light, to obtain a constant yield, and to improve diffraction efficiency.

Particularly, a full-color holographic optical element according to the invention is expected to be widely applicable to an HUD for vehicle, a holographic screen, a holographic lens, a wearable device, and the like.

BRIEF DESCRIPTION OF THE DRAWINGS

FIG. 1 illustrates a virtual image formed on a windshield of a vehicle provided with a head-up display;

FIGS. 2A to 2C illustrate head-up display devices in the related art;

FIG. 4 is a diagram illustrating a reproduction mode using a holographic optical element lens according to the embodiment of the invention;

FIG. 8 is a diagram illustrating a structure of a characteristic recording and analyzing system of a full-color holographic optical element according to the embodiment of the invention;

FIG. 9 is a flowchart for searching for a beam intensity ratio condition according to the embodiment of the invention;

FIG. 10 is a flowchart for checking a relation between a beam intensity ratio and an inhibition period according to the embodiment of the invention;

FIG. 11 is a flowchart for measuring diffraction efficiency through a beam intensity ratio and an inhibition period according to the embodiment of the invention;

FIG. 12 is a graph illustrating diffraction efficiency characteristics according to beam intensities according to wavelengths according to the embodiment of the invention; and FIGS. 13 to 16 are graphs illustrating the inhibition period characteristics according to beam intensities according to wavelengths according to the embodiment of the invention.

DETAILED DESCRIPTION

Figure 3:
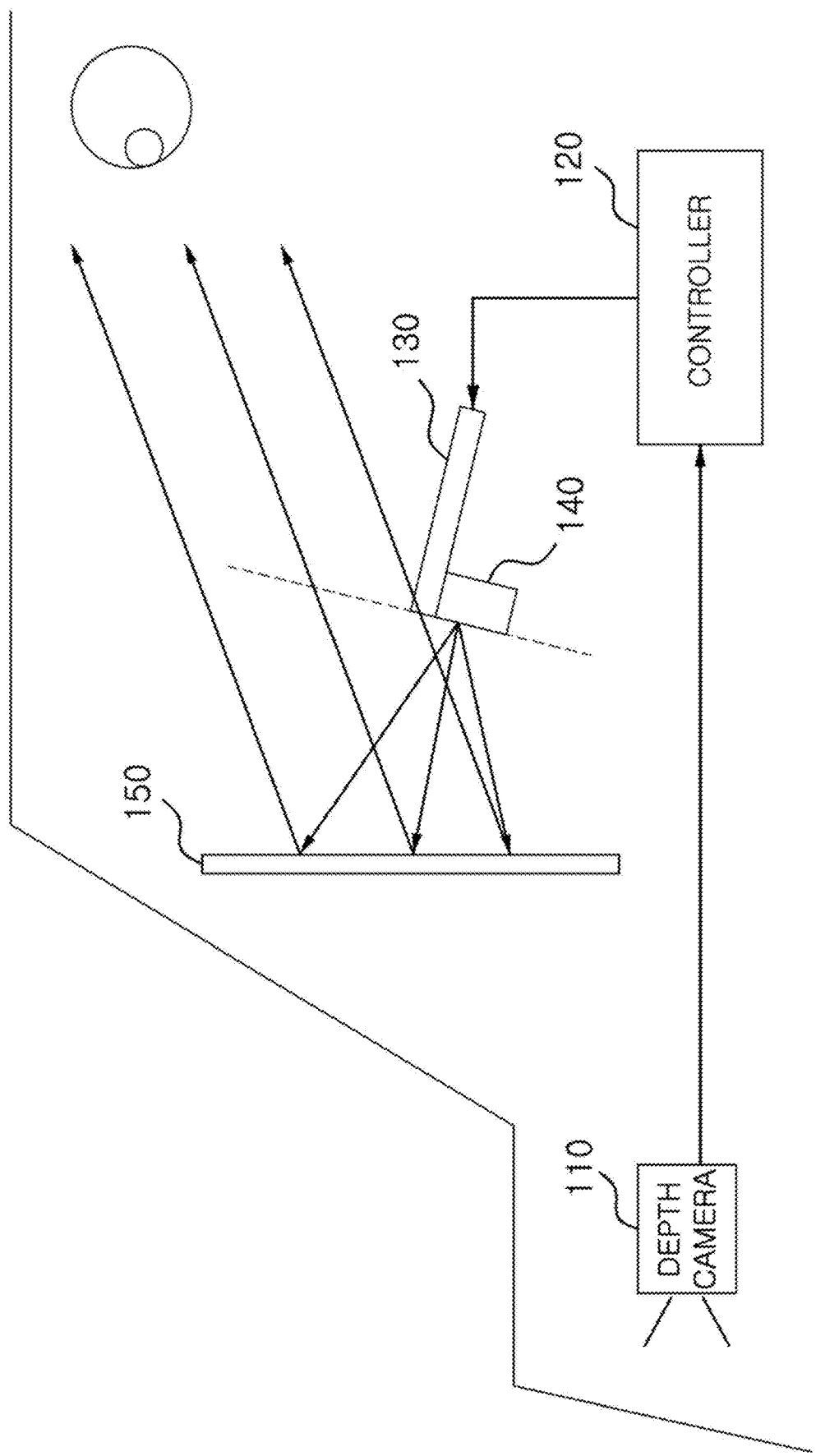
FIG. 3 is a diagram illustrating a structure of a head-up display device according to an embodiment of the invention.

The invention can include various modifications and various embodiments, and specific embodiments are illustrated in the drawings and described in detail. It is to be understood, however, that the invention is not to be limited to the specific embodiments, but includes all modifications, equivalents, and alternatives falling within the spirit and scope of the invention.

The terms used in this application are used only to describe specific embodiments, but the terms are not intended to limit the invention. A singular expression includes a plural expression unless the context clearly denotes otherwise. In this application, the terms "comprising", "having", and the like are used to specify that there are features, numerals, steps, operations, components, parts, or combinations thereof, and that one or more other features do not preclude the presence or addition of one or more other features, numerals, steps, operations, components, parts, or combinations thereof.

Unless otherwise defined, all terms used herein, including technical or scientific terms, have the same meaning as commonly understood by one of ordinary skilled in the art to which this invention belongs. In general, terms such as those defined in the dictionary used should be interpreted as having a meaning consistent with the contextual meaning of the related art, and unless otherwise explicitly defined in the present application, the terms are not interpreted in an ideal or overly formal meaning.

In addition, in the following description with reference to the accompanying drawings, the same components will be denoted by the same reference numerals regardless of the reference numerals, and redundant description thereof will be omitted. In the following description, well-known technique will not be described in detail since the detailed description would obscure the invention unnecessarily.

FIGS. 2A to 2C illustrate head-up display devices in the related art.

FIG. 2A illustrates a head-up display device using a convex lens, FIG. 2B illustrates a head-up display device using a mirror, and FIG. 2C illustrates a head-up display device using a mirror and a concave lens.

In the case of FIG. 2A, driver's eyes are located on the opposite side of the display and the convex lens, and the driver's viewpoint is placed in the direction of the convex lens in order to check image information, which may cause carelessness during the driving.

In the case of FIG. 2B, a virtual plane is created as much as an optical path between the display and the mirror, the virtual plane is provided mostly at a short position. Therefore, in order to widen the position of the virtual plane, an optical system is required to be added between the display and the mirror.

In the case of FIG. 2C, a concave lens as an optical system is added to the structure of FIG. 2B. However, this structure also occupies a lot of space near the dashboard of the vehicle.

FIG. 3 is a diagram illustrating a structure of a head-up display device according to an embodiment of the invention.

Referring to FIG. 3, the head-up display device according to the embodiment of the invention includes a depth camera 110, a controller 120, a motor stage 130, a display 140, and a holographic optical element (HOE) lens 150.

The depth camera 110 images the front side to acquire three-dimensional distance information. More specifically, in the invention, the depth camera 110 may acquire perspective distance information of the front road or may acquire the three-dimensional distance information by calculating the distance to the vehicle based on the horizon.

The controller 120 is a component for controlling the overall operations of the head-up display device and controls the display unit 140 to display a video signal.

The motor stage 130 serves to move the display unit 140 back and forth with respect to the holographic optical element lens 150.

The display unit 140 serves to display a video signal under the control of the controller 120.

The holographic optical element lens 150 is an element that reflects an image displayed on the display unit 140 such that a virtual screen is located at a predetermined distance.

In one embodiment of the invention, the controller 120 calculates the distance of the driver's gaze point on the basis of the distance information obtained from the depth camera 110, calculates position information of the position at which the virtual screen is reproduced, and can drive the motor stage 130 so that the virtual screen is located at the calculated position information.

The distance information of the distance between the holographic optical element lens 150 and the display unit 140 calculated on the basis of the position information of the position at which the virtual screen is reproduced may be stored in the lookup table in advance. At this time, the controller 120 can drive the motor stage 130 by referring to the lookup table so that the display unit 140 is located according to the position information of the virtual screen.

Figure 5A:
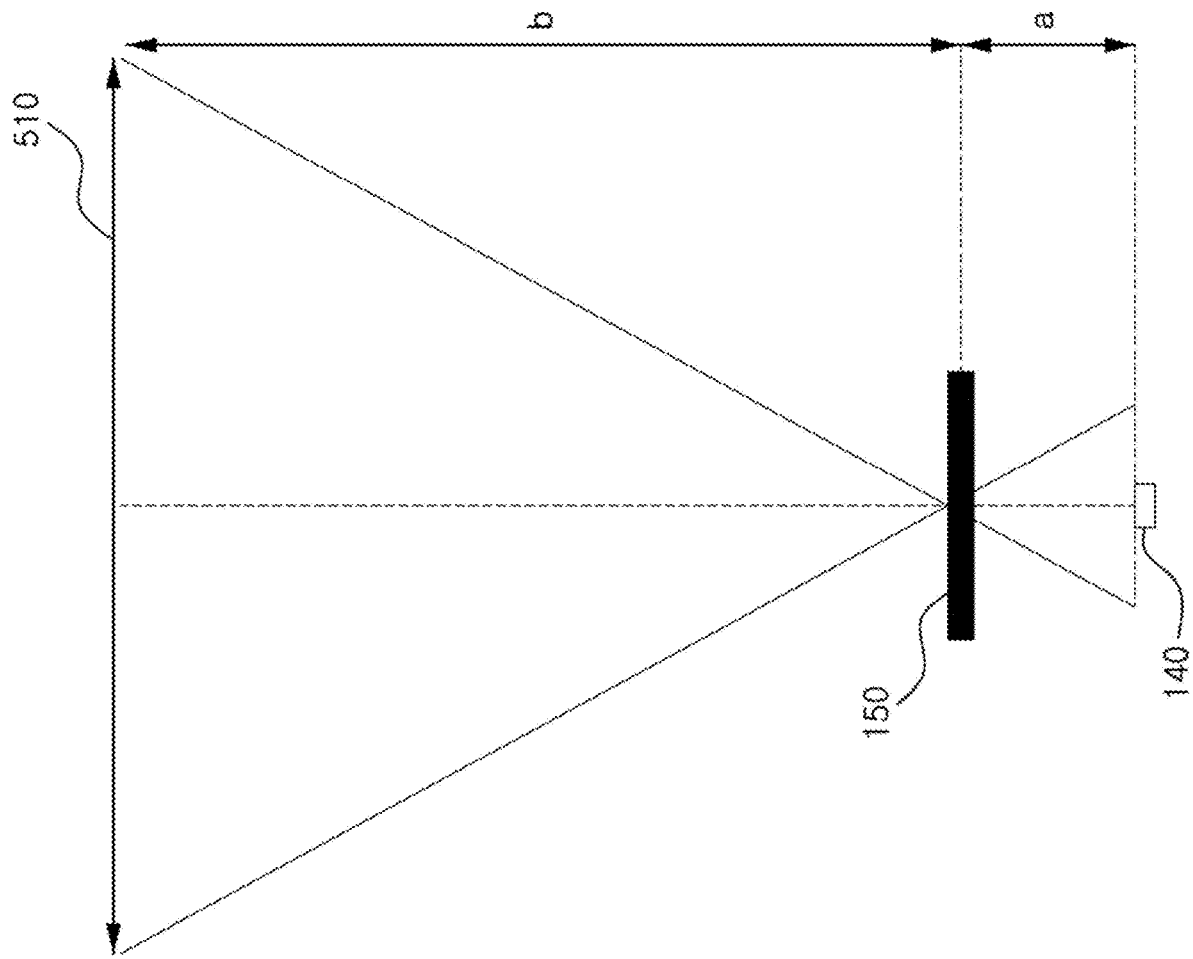
FIGS. 5A and 5B illustrate an equivalent structural diagram of a reproduction plane of a holographic optical element according to the embodiment of the invention.
Figure 5B:
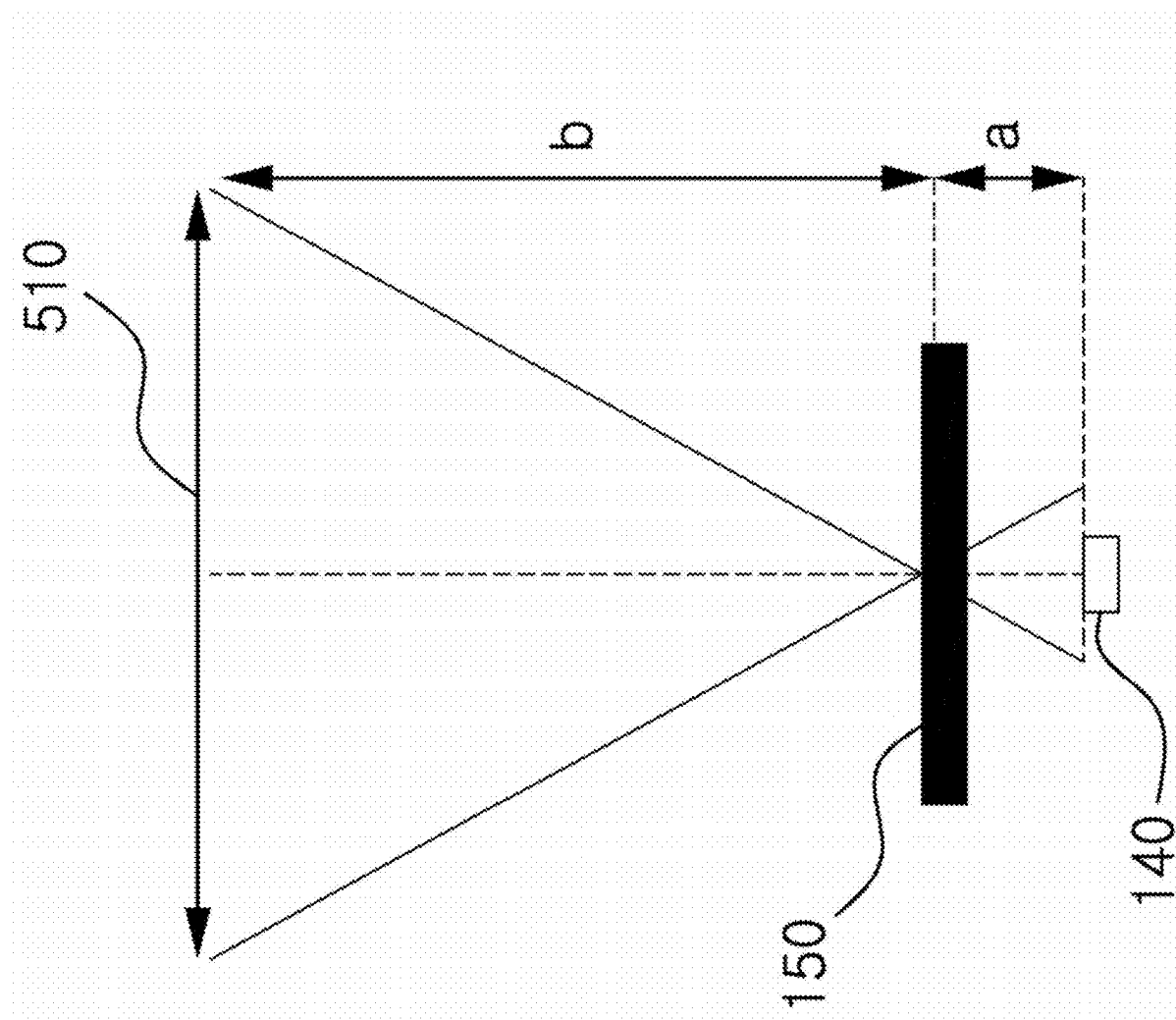

FIG. 4 is a diagram illustrating a reproduction mode using a holographic optical element lens according to the embodiment of the invention, and FIGS. 5A and 5B is an equivalent structural diagram of a reproduction plane of a holographic optical element according to the embodiment of the invention.

Referring to FIGS. 4, 5A, and 5B, when an image from the display unit 140 is incident on the holographic optical element lens 150 on which the lens characteristic is recorded, information of the image is transmitted to the driver's eyes.

In the head-up display device according to the embodiment of the invention, when the distance between the holographic optical element lens 150 and the display unit is denoted by "a" and the distance between the holographic optical element lens 150 and the driver's eyes is denoted by "b", the holographic optical element lens 150 according to the embodiment of the invention has such optical characteristics that the virtual screen is located at a position where the distance to the holographic optical element lens 150 is "b".

That is, in FIG. 4, in the head-up display device according to the embodiment of the invention, when the distance from the holographic optical element lens 150 to the display unit 140 is denoted by "a" and the distance from the holographic optical element lens 150 to the driver's eyes is denoted by "b", the holographic optical element lens 150 according to the embodiment of the invention has such characteristics as illustrated in FIGS. 5A and 5B.

In the case of FIG. 5A, when the objective lens is recorded, if the focal length is set to "a" and recording is performed, a plane of a virtual screen 510 is formed at a maximum distance "b" during the reproduction. At this time, the image quality is gradually changed according to the characteristics of the lens manufactured by using the holographic optical element, and a clean quality image is created at a short-distance position where the distance between the display unit 140 and the holographic optical element lens 150 is about 5 to 10% shorter than the maximum focal length "a". This is because, at the time of recording the holographic optical element lens, an angle error with respect to the central axis occurs due to the formation of a symmetric or asymmetric angle.

FIG. 5B illustrates a structure in which an image is formed when the distance between the display unit 140 and the holographic optical element lens 150 is shorter than that in the case of FIG. 5A. In the case of the lens using the holographic optical element lens, the distance to the virtual screen 510 is reduced, and the width of the corresponding screen is also reduced, but there is no problem of distortion or no problem as to whether or not image formation can be achieved.

Figure 6:
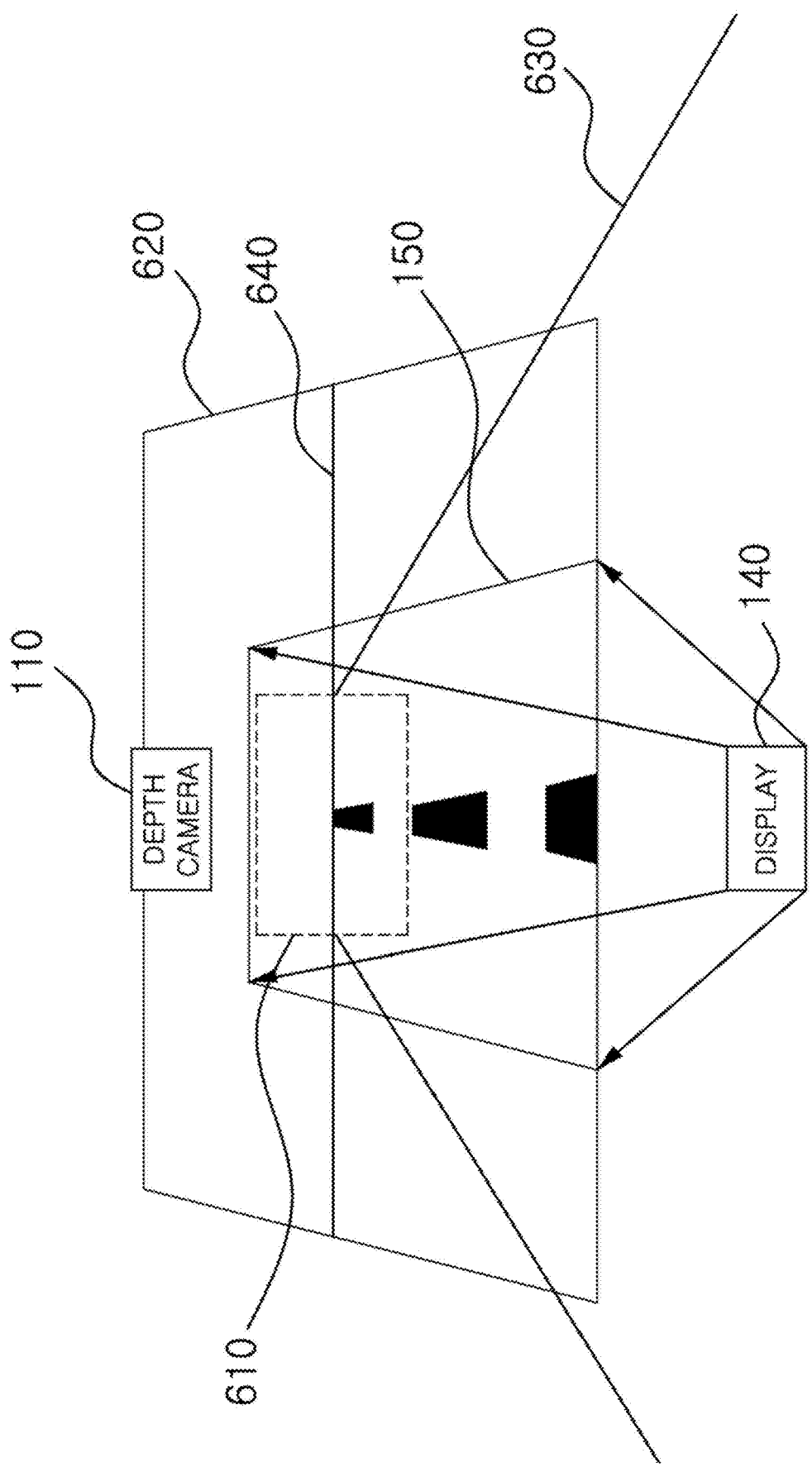
FIG. 6 illustrates a structure of a head-up display device viewed from a driver's viewpoint according to the embodiment of the invention.

FIG. 6 illustrates a structure of a head-up display device viewed from a driver's viewpoint according to the embodiment of the invention.

Referring to FIG. 6, it can be seen that at the driver's viewpoint, a plane 610 of the virtual screen is located in the windshield 620. In addition, a road 630 and a road horizon 640 are displayed. The depth camera 110 calculates the positional information at which the virtual screen is reproduced by using the perspective method of the road ahead or by calculating the distance from the vehicle to the horizon (road horizon 640).

In addition, the controller 120 moves the display unit 140 by referring to a lookup table calculated in advance on the basis of information calculated by the depth camera 110.

Figure 7:
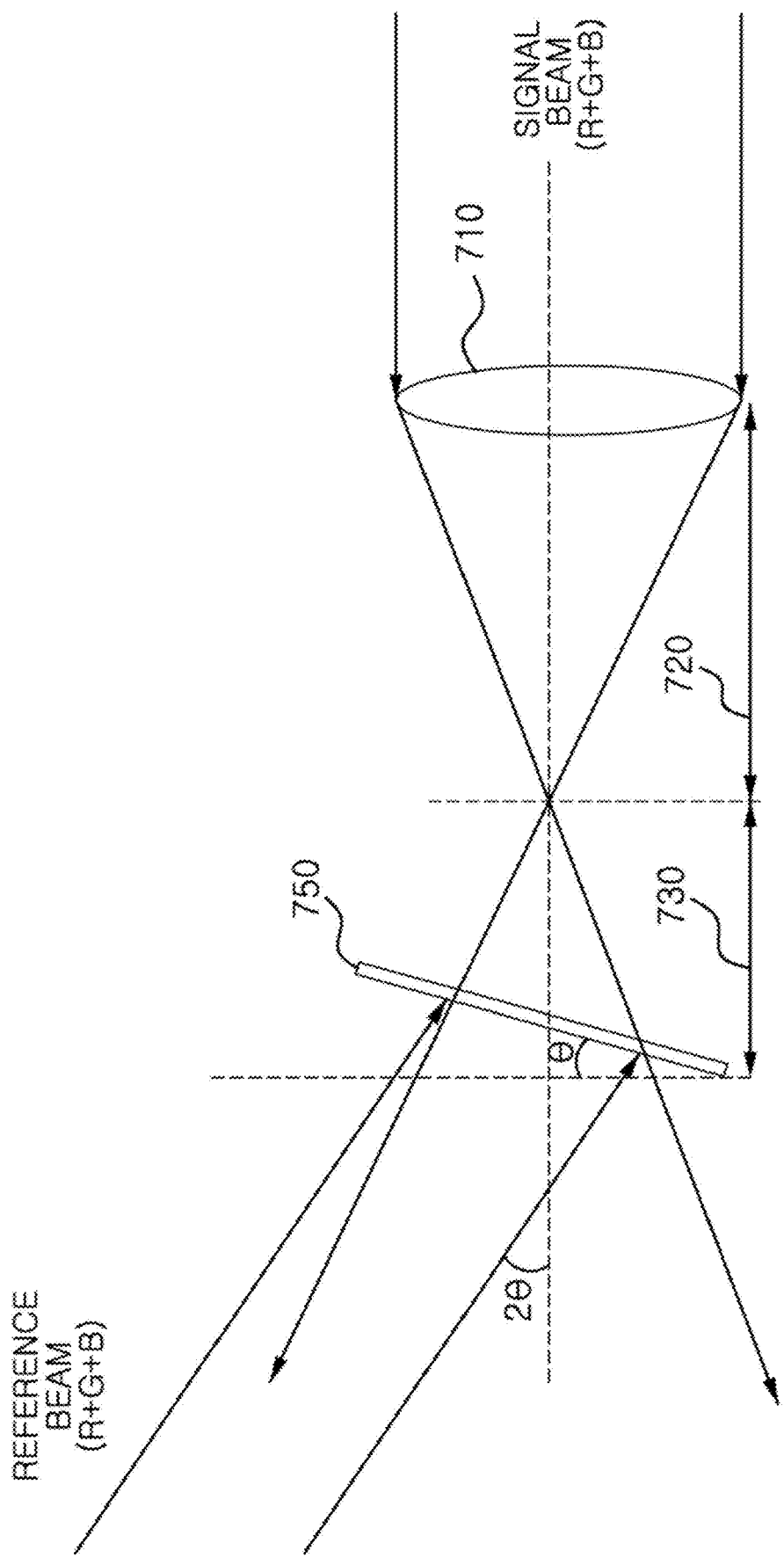
FIG. 7 is a diagram illustrating a process of manufacturing a holographic optical element lens according to the embodiment of the invention.

FIG. 7 is a diagram illustrating a process of manufacturing a holographic optical element lens according to the embodiment of the invention.

The holographic recording medium 750 copies the lens by using an objective lens 710 (or convex lens). In FIG. 7, the focal length of the objective lens 710 corresponds to a distance 720. In FIG. 7, the holographic recording medium 750 is located at a position separated by a distance 730 from the focus of the objective lens 710. To the extent that resolution is possible, the distance 730 may be larger than or smaller than the distance 720.

In FIG. 7, reference numeral 730 corresponds to "a" in FIG. 5A. "a" is the maximum value of the focal length of the holographic optical element lens 150 corresponding to the copied holographic recording medium 750. "a" in FIG. 5B is a distance which is smaller than the distance 730, but in which resolution is possible. For example, in a case where the distance 730 is 100 mm, "a" in FIG. 5B is smaller than 100 mm. Even if "a" in FIG. 5B is 50 mm, the tendency (the numerical aperture NA of the original objective lens) of the focus of the original holographic recording medium 750 maintains, the focal length of the holographic optical element lens 150 is still 100 mm.

Therefore, it is possible to focus on the image of the display unit 140, and thus, even in a case where the width of the plane of the virtual screen 510 in FIG. 5B is smaller than the width of the plane of the virtual screen 510 in FIG. 5A, a clear image is formed. In other words, once the lens characteristic is copied, irrespective of the focal length of the copied lens, if "a" in FIG. 5B is included within the NA angle of the copied lens, a clear image is formed on the virtual plane at the position separated by the distance "b".

Referring to FIG. 7 again, in a method of manufacturing a holographic optical element lens according to the embodiment of the invention, a signal beam as a mixture of laser beams having wavelengths of 633 nm, 532 nm, and 473 nm is incident on a first lens 710 having a large depth of field or a large numerical aperture (NA), the signal beam is converged to the focal length 720 of the first lens 710 and then is converted to a divergent form while passing through the focal plane, and then, the signal beam is incident on the holographic recording medium 750. In general, if a lens having a high NA value is used, the angle converging to the focal plane becomes large, instead of having a short focal length.

If the holographic recording medium 750 is separated from the signal beam passing through the focal plane of the first lens 710 by a desired area and focal length and, after that, recording into the holographic recording medium 750 is performed by using a reference beam, the holographic optical element lens having a desired area of the hologram recording surface and a desired focal length can be manufactured.

In FIG. 7, the holographic recording medium 750 is tilted by θ° with reference to the vertical axis perpendicular to the horizontal direction of the first lens 710 in order to record the hologram symmetrically. Then, the reference beam as a mixture of 633-nm, 532-nm, and 473-nm laser beams is allowed to be incident on the holographic recording medium 750 by being tilted by 2θ° with reference to the horizontal axis of the first lens 710. In the case of the photopolymer, when the area of the holographic optical element lens is about 4 inches, and the reference beam is incident at an angle 2θ° of 15° to 30° with reference to the horizontal axis of the first lens 710, the holographic optical element lens having small distortion and high diffraction efficiency at the time of reproduction can be manufactured. In particular, in a case where the angle of 2θ° with reference to the horizontal axis of the first lens 710 is 15°, the distortion surface is minimized, and in a case where the angle is 25° to 30°, the diffraction efficiency is the highest. If the angle is 30° or more, in the case where the area of the holographic optical element lens is 4 inches, only one image matched to both eyes may be reproduced. Therefore, in order to realize that the angle 2θ° is 30° or more, the holographic recording medium having an area of larger than 4 inches needs to be used.

In summary, according to the invention, in the method of manufacturing the full-color holographic optical element of the full-color holographic optical element manufacturing apparatus including the first lens 710 and the holographic recording medium 750 located farther away from the focal length of the first lens 710, the method includes: a step of allowing a signal beam including a mixture of laser beams having wavelengths of R (Red), G (Green) and B (Blue) to be incident on the first lens 710; and a step of recording a hologram in such a manner that a reference beam including a mixture of laser beams having wavelengths of R, G, and B is allowed to be incident on the holographic recording medium 750.

In the invention, the holographic recording medium 750 can be configured with a single medium, and a detailed description thereof will be described later.

The photopolymer is mainly configured with a cover layer (polyethylene film), a photopolymer layer, and a substrate layer. In the related art, a cover layer covering a substrate layer is mainly used. In recent years, however, a cellulose triacetate film (TAC) has been mainly used instead of the cover layer.

The inside of the photopolymer is configured with a matrix structure in which matrix precursors and imaging components corresponding to a wavelength reaction are mutually coupled. The refractive index is changed by the interference pattern generated at the time of recording the hologram, so that the grating is generated. At this time, the imaging component has different characteristics for the binding reactions according to wavelengths.

The invention proposes a recording method for optimizing the coupling reaction of the imaging components in such a photopolymer and a method for improving the diffraction efficiency of R (red), G (green) and B (blue) by 50% or more in one sheet of the medium.

The invention proposes a system and a recording method as follows.

First, the invention proposes measuring the diffraction efficiency according to the angle of incidence of the reflection type diffraction grating. In the case of holographic optical elements, the recording angles also vary depending on the application used in symmetrical and asymmetric configurations. In general, in the case of the photopolymers, the characteristics such as the reaction speed, the diffraction efficiency, and the recording time are different for the wavelengths of R, G, and B, but the diffraction efficiency with respect to the recording angle has a similar tendency. Therefore, when the recording light is allowed to be incident perpendicularly to the photopolymer with the lens characteristic, and the reference light is allowed to be incident on the photopolymer at different angles, the diffraction efficiency characteristic is analyzed. In this method, recording can be performed both symmetrically and asymmetrically, but since the symmetric mode has a diffraction efficiency of about 1% to 2% higher than the asymmetric mode, this method can be applied to the fields where the incident angle and the diffraction angle are important such as holographic optical elements which can quickly and accurately check the incident angle and are to be used for the HUD. The angle of incidence of the symmetric and asymmetric holographic optical elements, which can provide the highest efficiency, can be set on the basis of the checked results FIG. 8 is a diagram illustrating a structure of a characteristic recording and analyzing system of a full-color holographic optical element according to the embodiment of the invention.

FIG. 8 is a structural diagram of a system for recording and analyzing characteristics of a holographic optical element having lens characteristics by recording a reflection type photopolymer by using R, G, and B lasers.

Referring to FIG. 8, the holographic optical element recording/characteristic analyzing system 800 includes a green laser 801, a red laser 802, a blue laser 803, a beam steering 804, an attenuator 805, a first half wave plate 806, a first shutter 807, a first mirror 808, a second mirror 809, a third mirror 810, a spatial filter 811, a first lens 812, a first aperture 813, a polarization beam splitter (PBS) 814, a second shutter 815, a second half wave plate 816, a first rotation stage 817, a second rotation stage 818, a third rotation stage 819, a photopolymer 820, a fourth mirror 821, a fifth mirror 822, a second lens 823, a second aperture 824, an optical power meter 825, a shutter controller 840, and a motor controller 850.

The mirrors 821 and 822 are provided to the second rotation stage 818 and the third rotation stage 819, respectively, and the photopolymer 820 which is a holographic optical element is provided to the first rotation stage 817.

The green laser 801 outputs a laser beam in a green wavelength range, the red laser 802 outputs a laser beam in a red wavelength range, and the blue laser 803 outputs a laser beam in a blue wavelength range.

The beam steering 804, the attenuator 805, the first half wave plate 806, and the first shutter 807 can be located sequentially in the direction of the light beams output from the green laser 801, the red laser 802, and the blue laser 803.

In a case where it is difficult to control the power of the laser beams generated from the green laser 801, the red laser 802, and the blue laser 803, the power of the laser beams can be attenuated while passing the laser beams through the attenuator 805.

In addition, the half wave plate 806 serves to adjust the wavelengths of the laser beams in the red, green, and blue wavelength ranges to ½.

Then, whether or not to output the red, green, and blue laser beams is controlled through the first shutter 807.

The first mirror 808 is a mirror coated to reflect the laser beam of the green wavelength band, the second mirror 809 is a mirror coated to transmit the laser beam of the green wavelength band and reflect the laser beam of the red wavelength band, and the third mirror 810 is a mirror coated to transmits the laser beams of the green and red wavelength bands and to reflect the laser beam of the blue wavelength band.

The laser beams transmitted and reflected from the first to third mirrors 808 to 810 pass through the spatial filter 811 to be multiplexed and pass through the first lens 812 and the first aperture 813.

The first aperture 813 can be used to control the beam size at the final recording end, and the beams having various sizes can be used depending on the size of the first aperture 813.

The laser beam having passed through the first aperture 813 passes through the PBS 814 and is split in two directions and transmitted to the second rotation stage 818 and the third rotation stage 819.

Herein, the second shutter 815 is located between the PBS 814 and the second rotation stage 818, and the second aperture 824 is located between the third rotation stage 819 and the first rotation stage 817.

The linear stage 830 is provided so that the first rotation stage 817 can move linearly.

The shutter controller 840 controls the operations of the first shutter 807 and the second shutter 815.

The motor controller 850 serves to control the driving of the first rotation stage 817, the second rotation stage 818, and the third rotation stage 819.

The PBS 814 splits the beam incident from the main light source into two optical paths.

The second rotation stage 818 is located on the first optical path among the optical paths split by the PBS 814, and the third rotation stage 819 is located on the second optical path among the optical paths split by the PBS 814.

In addition, the first rotation stage 817 is located on the linear stage 830 and is provided with the photopolymer 820.

The optical power meter 825 serves to record a diffraction phenomenon generated by the hologram when the laser beam is incident on the photopolymer 820.

The holographic optical element recording/characteristic analyzing system 800 can control the output from the attenuator 805 located in each of the three light sources and can control the incident angle by using the first to fourth rotation stages 817 to 819.

In addition, the holographic optical element recording/characteristic analyzing system 800 is provided with an optical power meter 825 for measuring the diffraction characteristics of the recorded photopolymer can analyze the characteristics of the recording medium. At this time, the position of the optical power meter 825 can be changed according to the angle or the like at the time of recording the hologram.

In addition, in the invention, the conditions for the beam intensity ratio at the time of recording the hologram are analyzed by using the wavelengths of R, G, and B with reference to the first incident angle.

At the time of recording a holographic grating or an interference pattern, the imaging components (various elements such as monomers, dyes, and initiators) within a limited space of the holographic recording medium have limited resources, the grating is formed with the resources being divided according to the wavelengths.

At this time, the diffraction efficiency with respect to the formed grating is higher in the case of simultaneous recording than in the case of separately or sequentially recording the wavelengths of R, G, and B. Therefore, in order to simultaneously record the wavelengths, it is first necessary to know the beam intensity ratio of the wavelengths. Since the reaction speed of the imaging components inside the photopolymer varies according to the wavelength, it is important to check at which wavelength the reaction proceeds quickly and at which wavelength the reaction proceeds late. Since the late-reacting wavelengths can be used for recording the wavelength that quickly react with the consuming resources, it is important to obtain the conditions for even resource allocation of the imaging components. For example, in a case where the reaction speeds in the recording of the diffraction grating are in the order of R>G>B, the holographic optical element having a similar diffraction efficiency can be manufactured only when the beam intensities are in the order of B>G>R.

FIG. 9 is a flowchart for searching for a beam intensity ratio condition according to the embodiment of the invention.

Referring to FIG. 9, in order to search for the condition of the beam intensity ratio of R, G, and B (S901), the reaction speeds are measured at time of recording the wavelengths of R, G, and B (S903). Then, the beam intensities of R, G, and B are set so as to be in a reverse order of the order of the reaction speeds of R, G, and B (S905 to S927). That is, the beam intensity ratio of R, G, and B is set so that the beam intensity is weakened as the reaction speed is higher.

For example, in a case where the wavelength of R has the fastest reaction speed, if the wavelength of G is faster than the wavelength of B in terms of the reaction speed of the wavelength of G and the wavelength of B, the order of the reaction speed is R>G>B, so that the beam intensity ratio is set to be B>G>R, and the maximum beam intensity of the wavelength of B at the time of recording the hologram is set to 1 mW/cm².

As described above, at the time of recording a holographic grating or interference pattern, imaging components (various elements such as a monomer, a die, and an initiator) are limited within a limited space of the holographic recording medium, and thus, a grating is generated by dividing resources for respective wavelengths. At this time, the diffraction efficiency is higher in the case of simultaneously recording than in the case of recording R, G, and B.

Therefore, in order to simultaneously record, it is necessary to know the characteristics of the reaction speeds versus the beam intensities of wavelengths, and it is necessary to know the order of the wavelengths in terms of the reaction speed.

At this time, if the beam intensity according to the wavelength is as high as 1 mW/cm² or more at the time of grating recording, the reaction time is fast, and thus, the diffraction efficiency reaches the saturation region within a few seconds, so that the diffraction efficiency becomes low.

In addition, if the beam intensity according to the wavelength is too low, the photoinitiator or the dye reacts before the monomer is polymerized due to the long exposure, so that the diffraction efficiency becomes low.

Therefore, as the recording reaction speed is higher, the beam is required to be finally weakened in the case of simultaneously recording, and the characteristics are analyzed in the invention.

FIG. 10 is a flowchart for checking a relation between the beam intensity ratio and the inhibition period according to the embodiment of the invention.

FIG. 10, when the wavelength of the maximum beam intensity set in the condition search of FIG. 9 is determined, the hologram is recorded sequentially for 0 to 500 seconds by setting the beam intensities of the remaining wavelengths to be low, and as an algorithm to measure the maximum beam maximum intensities of R, G, and B is set to 1 mW/cm$^2$.

In general, a hologram using a photopolymer needs to be subjected to certain energy or more, so that the holographic grating is formed slowly. In this case, the period where the reaction does not occur is called an inhibition period. As described above, since the grating should be generated by uniformly allocating the limited resources inside the photopolymer simultaneously, a key point of the invention is to find a condition having the same inhibition periods for all wavelengths of R, G, and B.

Referring to FIG. 10, in order to measure the inhibition periods for the wavelengths (S101), while reducing the beam intensities by about 5% from the maximum beam maximum intensities of R, G, and B, the inhibition periods are measured (S103 to S113).

If the maximum value of the wavelength of B is 1 mW/cm$^2$ (S111), the wavelengths of G and B are set to 0.5 mW/cm$^2$, respectively, and the inhibition periods for beam intensities are measured about 20 times (S113).

Then, a correlation graph between the beam intensity ratio and the inhibition period is output (S115).

FIG. 11 is a flowchart for measuring the diffraction efficiency through the beam intensity ratio and the inhibition period according to the embodiment of the invention.

FIG. 11 is an algorithm for searching for the intensities of wavelengths of R, G, and B in the same inhibition period through a graph or a measurement result of the inhibition periods according to the beam intensity ratios derived in FIG. 10.

In FIG. 11, the diffraction efficiency is measured through the beam intensity ratio and the inhibition period derived from FIG. 10, through the beam intensity ratio having the same time on the basis of the same inhibition period for the wavelengths of R, G, and B. While the beam intensities are decreased by 5% from the maximum beam intensities of R, G, and B according to the corresponding order, the diffraction efficiency is measured. If the diffraction efficiency is lower than the maximum diffraction efficiency obtained from the previous data, the efficiency is no longer improved, and thus, the operation is finished. Through the data of the optimum beam intensities of R, G and B acquired therefrom, an optimum recording condition having an intensity of 50% or more can be checked.

Referring to FIG. 11, the beam intensity ratio of R, G and B is checked from the beam intensity ration inhibition period data (S201 and S203) for the diffraction efficiency enhancement technique, and the beam intensity output having the maximum diffraction efficiency can be ensured in comparison with the inhibition period (S205 to S251).

For example, when R has a maximum beam intensity output of 1 mW/cm$^2$ (S205), and when the beam intensity ratio order is R>G>B (S207), the inhibition period of R and the inhibition periods of G and B are compared and, if the inhibition periods are the same (S209), the diffraction efficiency is measured while the beam intensity is decreased by 5%, and the diffraction efficiency is measured (S211). If the diffraction efficiency is lower than the maximum diffraction efficiency obtained from the previous data, the diffraction efficiency is not improved any more, so that the operation is ended.

In this manner, in all cases with respect to the beam intensity ratio of R, G, and B, the output of the beam intensity ratio having the maximum diffraction efficiency can be calculated.

FIG. 12 is a graph illustrating diffraction efficiency characteristics according to beam intensities according to wavelengths according to the embodiment of the invention.

Referring to the graph of FIG. 12, it can be seen that the diffraction efficiency is the highest of 56.84% when R=0.1, G=0.01, and B=0.25 (mW/cm$^2$). It can be seen that the diffraction efficiency is greatly decreased when R=0.01, G=0.011, and B=0.025 (mW/cm$^2$).

FIGS. 13 to 16 are graphs illustrating the inhibition period characteristics according to beam intensities according to wavelengths according to the embodiment of the invention.

FIG. 13 illustrates the inhibition period characteristic of the 473-nm wavelength of the blue (B) beam. FIG. 14 illustrates the inhibition period characteristic of the 532-nm wavelength of the green (G) beam. FIG. 15 illustrates the inhibition period characteristic of the 633-nm wavelength of the red (R) beam. FIG. 16 is a graph illustrating the inhibition period characteristics of the three wavelengths of FIGS. 13 to 15.

Thus, in the invention, a holographic optical element having the maximum diffraction efficiency can be manufactured by searching for conditions having the same inhibition period for the beam intensities.

While the invention has been described in terms of several preferred embodiments, these embodiments are illustrative and not restrictive. It will be understood by those skilled in the art that various changes and modifications may be made therein without departing from the spirit of the invention and the scope of the appended claims.

What is claimed is:

1. A method of manufacturing a full-color holographic optical element in a full-color holographic optical element manufacturing apparatus including a lens and a holographic recording medium located farther away than a focal length of the lens, the method comprising:
    allowing a signal beam including a mixture of laser beams having wavelengths of R (Red), G (Green), and B (Blue) to be incident on the lens; and
    recording a hologram in such a manner that a reference beam, which includes a different mixture of laser beams having wavelengths of R, G, and B than the signal beam, is allowed to be incident on the holographic recording medium,
    wherein the holographic recording medium is configured with a single medium, and
    when a time period during which a reaction does not occur from a time when the photopolymer is irradiated with the laser beams and to a time when formation of the holographic grating is started is referred to as an inhibition period, the full-color holographic optical element manufacturing apparatus sets the intensities of the laser beams of R, G, and B so that the inhibition periods for the laser beams of R, G, and B are the same.

2. The method according to claim 1, wherein the holographic recording medium is a photopolymer.

3. The method according to claim 2, wherein the full-color holographic optical element manufacturing apparatus measures reaction speeds of the laser beams of R, G, and B when recording a holographic grating in the photopolymer and sets intensities of the laser beams in a reverse order of an order of the reaction speeds of the laser beams.

4. A head-up display device comprising the full-color holographic optical element manufactured by the method according to claim 1.

* * * * *